Figure 1:
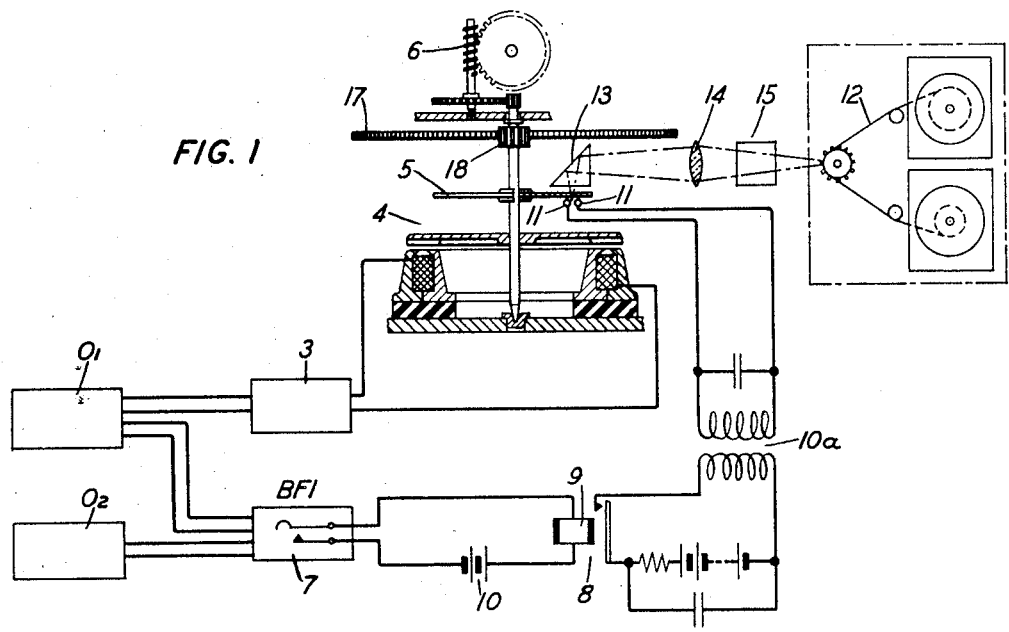

Nov. 28, 1933.  W. A. MARRISON  1,936,683

FREQUENCY MEASUREMENT

Filed Sept. 4, 1931

INVENTOR
W. A. MARRISON
BY Guy T. Morris
ATTORNEY

Patented Nov. 28, 1933

1,936,683

UNITED STATES PATENT OFFICE 1,936,683

FREQUENCY MEASUREMENT

Warren A. Marrison, Maplewood, N. J., assignor to Bell Telephone Laboratories, Incorporated, New York, N. Y., a corporation of New York Application September 4, 1931. Serial No. 561,135

4 Claims. (Cl. 234—1.5)

This invention relates to method and means for accurate comparison between the frequencies derived from independent sources and the application is a continuation in part of application Serial No. 352,038, filed April 2, 1929.

It is an object of the invention to make a continuous and accurate comparison between the frequencies of the waves derived from a plurality of simultaneously and continuously operating wave sources.

The embodiment of a practical means for achieving the above object involves circuit relations and mechanisms adaptable to recording systems of widely variant forms and usable in widely variant relationships, and which embody novel features of general application in electrical recording systems. Therefore a subsidiary object of the invention is, broadly, to effect recordation of a given electrical variation or sequence of electrical variations more efficiently and accurately, and with greater sensitiveness than by prior methods or means, with greater simplicity of circuit and structural detail, and with greater economy of plant.

The invention is particularly adaptable to measure extremely small variations in relative frequency of any two waves to be compared. In a preferred form of the invention use is made of the expedient of photographic reproduction of a scale reading which is made variable as in accordance with the variation of the beat frequency between the two waves concerned. In this method the wave from one of the comparison sources, stepped down in frequency if necessary, is used to drive a synchronous motor integrally connected to which is a rotatable scale. Electric sparks are caused to occur at a fixed point beneath the rotating scale at a frequency proportional to the beat between the frequency of the above wave and the frequency of the wave from the second source, and, therefore, proportional to the difference between the two frequencies concerned in the comparison. These sparks illuminate a section of the scale, which is photographed on a movable film. If the beat frequency is constant, with a correctly adjusted rotational speed of the scale, and with a correct step-down of the first frequency, the same scale number will be photographed in each instance. If the beat frequency varies from the above value, that fact will be evidenced by a gradual progression of magnitude of the scale numbers so photographed. With proper choosing of elements this method can be used to measure frequency differences, or a variation of relative frequency, to an accuracy as great as one part in ten billion.

Figure 2:
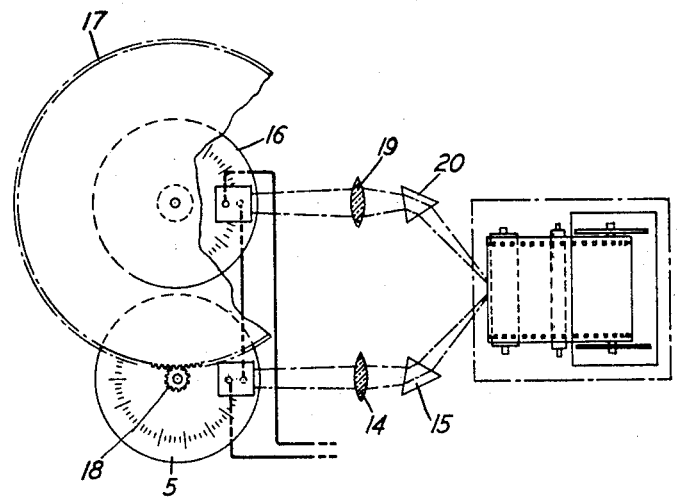

The above described features, as well as other features of the invention, more fully appearing hereafter, are realized in the arrangement set forth in the following description and illustrated in the accompanying drawing, in which:

Fig. 1 illustrates a specific form of the invention adapted for measuring extremely small variations in relative frequency, and Fig. 2 illustrates a detail of the system illustrated by Fig. 1.

Referring to Fig. 1, the two wave sources, the beat frequency of which is to be measured by the method of the invention, are indicated by reference numerals $O_1$ and $O_2$. The wave from source $O_1$ is converted to a wave of a definitely lower frequency by device 3 which may, for example, be a subharmonic frequency producer whose fundamental is based on the frequency of source $O_1$. An example of such a subharmonic frequency producer is illustrated in U. S. patent to Schelleng 1,527,228, granted February 24, 1925. The use of this frequency step-down means, in a practical case, is predicated on the use of other elements of the system whose frequencies have related given values and such means is not essential in the theoretical operation of the invention.

The wave from device 3 is used to drive a synchronous motor represented generally by reference numeral 4, the rotor of which has integrally attached to it a transparent scale 5. The motor may be adapted, in other environments, to perform other work than that required in the practice of this invention, as by the mechanical movement 6. The synchronous motor 4 is merely typical of a great many alternative types of synchronous motor that could equally well be used, the particular type illustrated being that otherwise illustrated and described in detail in a paper by J. W. Horton and the present applicant, in the Proceedings of the Institute of Radio Engineers for February, 1928, entitled "Precision determination of frequency" in which see particularly Fig. 10 and the context.

The device BFI is a beat frequency indicator. Its function is to produce from the waves derived from sources $O_1$ and $O_2$ a wave of their difference frequency and to actuate circuit closer 7 at the beat frequency. A device which is capable of performing those functions and which may therefore be used in the system of Fig. 1 is illustrated in Fig. 1, for example, of U. S. patent to Affel, 1,450,966, granted April 10, 1923.

The periodic closure of circuit closer 7 actuates relay 8 by means of electromagnet 9 and direct current source 10, at a corresponding frequency.

The periodic operation of relay 8 results in an impulsive energization of the primary winding of transformer 10a at a corresponding frequency and eventually in the production of a spark between electrodes 11 which complete a circuit across the transformer secondary.

Each spark discharge across electrodes 11 illuminates a small portion of the transparent rotating scale 5, and, under ideal conditions, a single scale reading of the scale. The portion of the scale, or the scale reading, as so illuminated is photographed on a slowly moving film 12 by means of light incident on the film by a path including the prism 13 or the like and a lens 14. Additional prism 15 may be used to adjust the angularity of the light beam in a plane normal to the paper, if desired. If the periodicity of spark occurrence has an integral multiple relation to the periodicity of rotation of the scale, whether higher or lower, as should be provided for a given desired beat frequency, the same scale division will be repeated consecutively in the photograph record. A deviation from this condition indicates, and measures the extent of, a variation of the beat frequency from such value. For practical reasons, of course, the photographic device must comprise means for continuously feeding the film and for preventing exposure of the film except due to the spark illumination. Mechanisms capable of performing such functions are well known in the art and will not be described here. It is indicated schematically by the showing of the structure immediately associated with the film 12, the whole being included in dashed lines to represent a closure member.

The efficient operation of the invention so far described depends on the use of critical values of the electrical constants concerned in its function. In the particular apparatus that has been used by applicant and found effective, the scale 5 has one hundred numbered divisions and is driven at 10 revolutions per second by a thousand-cycle synchronous motor driven from a subharmonic frequency producer, the source corresponding to source $O_1$ of the figure being adapted to generate a wave of 100,000 cycles frequency and the other source being adapted to generate a wave of 100,000.1 cycles frequency. With the values as given above, which are typical, the beat frequency between the oscillators $O_1$ and $O_2$, as measured by the accuracy with which the scale reading may be photographed, may be indicated to an accuracy of one part in ten thousand and the percentage error in the beat frequency, with the values as above, is one million times as great as the percentage error in the primary frequency from source $O_1$ or $O_2$. Accordingly, by the method described, the primary frequencies from sources $O_1$ and $O_2$ may be compared with a precision of one part in ten billion. By such a precise method arrangement much has been, and can be, learned about the nature of variations that occur in frequencies of wave sources. The method as practiced in the specific form illustrated and above described, is adaptable to the comparison of waves from high frequency sources about which especially there is much to be learned by the employment of the invention. However, the principle is applicable to comparison of any two frequencies without regard to their order of value or their order of difference.

It will be obvious that in special instances the invention may be practiced effectively without the use of frequency step-down means 3 or of the combining means BFI. Of course, other means than that specifically described and illustrated for periodically illuminating the scale may be used within the contemplation of the invention, the only necessary condition being a proper relation between the periodicity of the illumination and that of the beat frequency or of the frequency of the second source. This relation may be satisfied if the two periodicities are not the same so long as they are commensurable. Depending on the precise illuminating source and its physical relation to the scale, the scale may or may not be transparent.

The practice of the invention as so far described presumes that, with the other values as given, the interval between sparks is less than .1 second. With this condition satisfied the exact interval can be determined directly from the photographic record. Fig. 2 illustrates the use of a certain expedient to avoid the ambiguity which would result where the sparks occur at intervals greater than .1 second and particularly where the scale rotates several times between the spark occurrence. The one tenth cycle interval corresponds, of course, to one complete rotation.

As illustrating this expedient, Fig. 2 discloses a second auxiliary scale geared to the first scale so that it makes one revolution for each one hundred revolutions of the first scale. The spark traverses two gaps in series, one illuminating each scale, and the two sparks are recorded simultaneously on the same film. On the second scale each division corresponds to an interval of .1 second, while on the first scale, as before, each division corresponds to .001 second. The method may, of course, be extended by the use of more scales, if the spark interval should be greater than the time of rotation of the first auxiliary scale. It is noted that although Fig. 1 was described as if only one scale were used, as a matter of fact it also discloses, as well as possible with the view chosen, the use of this auxiliary scale and its immediately associated structure. The auxiliary scale is identified by reference numeral 16 in Fig. 2, the speed reduction being accomplished through meshed gears 17 and 18. In Fig. 1 the auxiliary scale 16 is positioned directly back of the scale 5 so that it is not exposed to view. Lens 19 and prism 20 function analogously as lens 14 and prism 15 to direct the image of the second spark to a point on the common film adjacent the spark which illuminates the first scale.

Of course, the general principles herein disclosed may be embodied in many organizations widely different from those illustrated, especially as to the numerical values concerned, without departing from the spirit of the invention as defined in the appended claims.

What is claimed is:

1. A frequency comparison system comprising in combination, two sources of waves whose frequencies are to be compared, a synchronous motor in operable relation to one of said sources, a scale, means for moving said scale at a speed proportional to the rotational speed of said motor, means for periodically illuminating a portion of said scale at a frequency effected by the frequency of the waves from the other source, and means for photographing the portion of the scale so illuminated.

2. A frequency comparison system comprising in combination, two sources of waves whose frequencies are to be compared, a synchronous motor connected to one of said sources, a rotatable scale driven by said motor, means for periodically illuminating a relatively small portion of said scale at a frequency proportional to the relative frequency of one of said sources with respect to the frequency of the other source, and means for photographing by said illumination the portion of the scale so illuminated.

3. A frequency comparison system comprising in combination, two sources of waves whose frequencies are to be compared, a synchronous motor connected to one of said sources, a transparent rotatable scale adapted to be driven by said motor, means for combining the waves from the two sources, spark discharge electrodes positioned close to and underneath said scale, means for causing a discharge between said electrodes at the combination frequency, and photographic means on the opposite side of said transparent scale from said electrodes for photographing, by the illumination produced by said discharge, the portion of the scale so illuminated.

4. The combination specified in claim 1 and, additionally, a second scale, means gearing it with the first scale so that a major scale interval thereon corresponds to one complete rotation of the first scale, and means for illuminating a portion of said second scale coincidentally with the operation of the corresponding means effecting the first scale, and for photographing the portion of the scale so illuminated adjacent to the photographic record of the portion of the first scale similarly photographed.

WARREN A. MARRISON.